United States Patent [19]

Doolittle et al.

[11] Patent Number: 5,186,073
[45] Date of Patent: Feb. 16, 1993

[54] PARKING BRAKE OPERATING HANDLE ATTACHMENT

[75] Inventors: Miles G. Doolittle, Royal Oak; Frank Kuzinski, Waterford, both of Mich.

[73] Assignee: Dura Mechanical Components, Inc., Troy, Mich.

[21] Appl. No.: 883,526

[22] Filed: May 15, 1992

[51] Int. Cl.⁵ .......................... G05G 1/02; G05G 5/06
[52] U.S. Cl. ........................................ 74/503; 74/529;
  74/536; 74/540; 403/326; 403/379; 29/453
[58] Field of Search .............. 74/503, 523, 529, 536,
  74/540, 543; 180/90; 296/70, 73; 29/453, 525;
  403/378, 379, 326

[56] References Cited

U.S. PATENT DOCUMENTS

| | | | |
|---|---|---|---|
| 3,228,254 | 1/1966 | Biesecker | 74/543 X |
| 3,693,471 | 9/1972 | Glance | 74/540 X |
| 4,364,284 | 12/1982 | Tani et al. | 74/540 |
| 4,505,058 | 3/1985 | Peterson | 403/326 X |
| 4,604,913 | 8/1986 | Kyonomine | 74/540 |
| 4,612,823 | 9/1986 | De Leeuw et al. | 74/540 X |
| 5,000,614 | 3/1991 | Walker et al. | 403/326 |
| 5,054,333 | 10/1991 | Scott et al. | 74/512 |
| 5,086,662 | 2/1992 | Tayon et al. | 74/501.5 R |

*Primary Examiner*—Richard Lorence
*Attorney, Agent, or Firm*—David A. Greenlee

[57] ABSTRACT

Apparatus is provided for operatively connecting an operating rod to a parking brake latch release lever when a vehicle instrument panel is installed to a vehicle support structure. A handle is mounted on one end of the operating rod that is pre-installed in the instrument panel prior to panel installation. The other end of the rod is provided with an elongated fitting having a series of spaced annular ridges comprising leading camming surfaces and trailing locking surfaces. The latch lever mounts a receptor fitting having an entry funnel that enters a central bore. A spring clip includes fingers which enter the bore through slots. The operating rod is initially pulled out to release position. When the instrument panel is later installed, the projector rod is guided into the receptor bore by the funnel. As the rod fitting is inserted, the spring fingers are cammed over the ridges by the camming surfaces until the rod fitting is fully inserted. The fingers engage the rod locking shoulder in that position to prevent withdrawal of the rod fitting. This operatively connects the operating rod to the release lever to enable parking brake release by manually pulling out the handle. The spring clip has a connecting portion extending outside of the receptor to enable grasping and removal to permit withdrawal of the rod fitting to enable instrument panel removal.

18 Claims, 2 Drawing Sheets

PARKING BRAKE OPERATING HANDLE ATTACHMENT

BACKGROUND OF THE INVENTION

This invention relates generally to vehicle parking brake actuators and, more particularly, to apparatus and method of assembling an operating device to a parking brake release member.

Foot-operated parking brake actuators are frequently provided in vehicles for applying the parking brake. These actuators have a foot-operated pedal lever which has a sector that is engaged by a locking pawl to retain the parking brake in applied position. A manually-operated release handle is provided to operate a release mechanism to disengage the pawl from the sector to release the parking brake.

If a clear linear path is available, the release handle is connected to the release mechanism by a rod which is mounted for sliding movement in the vehicle structure, as illustrated in U.S. Pat. No. 5,054,333 to Scott et al. In some vehicles, this handle is mounted on a bracket below the vehicle's instrument panel. In other vehicles, the handle extends through a fitting in the face of the instrument panel.

If a clear linear path is unavailable, the handle is connected to the release mechanism by a Bowden cable comprising a wire sliding within a fixed-length sheath. In some of these vehicles, the vehicle design makes it difficult to connect the handle to the release mechanism after the instrument panel is installed. To simplify this connection, the handle is pre-installed in the instrument panel and the cable is connected to the release mechanism before the instrument panel is installed to vehicle supporting structure.

The use of an elongated Bowden cable is required to enable this pre-installation, since the instrument panel is initially located away from the supporting structure when the cable is installed. The cable is supplied in looped form. One wire end is connected to the handle and that sheath end is attached to the instrument panel. Next, the instrument panel is moved toward the support and the cable is stretched, tightening the loop, to enable attachment of the other cable end to the parking brake actuator. The other wire end is attached to the release lever and the sheath end is mounted on the actuator structure. The instrument panel is then installed by mounting on the supporting structure. The cable then resumes its enlarged 360° loop to accommodate the decreased distance between the operating handle and the parking brake actuator.

Since the cable comprises a wire sliding within a sheath, this looping of the cable dramatically decreases its mechanical efficiency. This results in a corresponding increase in the manual effort required to operate the release mechanism. In one such vehicle application, the manual effort required to release the parking brake doubles from 20# to 40#.

With this elongated Bowden cable connecting arrangement, any removal of the instrument panel requires that one end of the cable be disconnected before the instrument panel can be completely removed. This involves disconnecting both the wire and the sheath at either the handle end or the actuator end.

It would be desirable to provide a connecting device for operatively connecting a parking brake release mechanism to an operating handle, that is pre-installed in an instrument panel which is subsequently installed to vehicle structure, which is operable to release the parking brake without increased manual force.

It would also be desirable to provide such a connecting device which is simpler to connect and to disconnect.

SUMMARY OF THE INVENTION

It is therefore an object of this invention to provide a connecting device for operatively connecting a parking brake release mechanism to an operating handle, that is pre-installed in an instrument panel which is subsequently installed to vehicle structure, which is operable to release the parking brake without increased manual force.

Another object of this invention is to provide such a connecting device which is simpler to connect and to disconnect.

Accordingly, this invention features a connecting device for use in a vehicle having a parking brake actuator movable between positions to apply and release a parking brake, a latch mechanism for latching the actuator in brake apply position including a latch release member, and an operating member mounted on the vehicle structure for operating the latch release member. The connecting device connects the operating member to the latch release member. It comprises interengageable fittings on both members for operatively interconnecting the members together. One of the fittings comprises a projector having an elongated locking surface, while the other of the fittings comprises a receptor for receiving the projector throughout a range of positions. Locking means are carried by the receptor for engaging the projector upon insertion to any position in said range while preventing withdrawal of the projector.

In one aspect, this invention features the projector being an elongated rod, and the receptor including an entrance funnel for guiding the projector rod into the receptor to accommodate relative misalignment of the projector and receptor.

In another aspect, this invention features a projector rod having a plurality of longitudinally-spaced ridges that have leading camming surfaces and trailing locking shoulders. The receptor locking means comprise a locking finger biased into contact with the rod. Each camming surface moves the finger away from the rod to enable insertion as far as desired. The finger engages a locking shoulder behind a ridge to prevent subsequent withdrawal of the rod.

In yet another aspect, this invention features the locking means being a spring clip comprising spring locking fingers which engage the locking shoulders and a connection portion which is engageable externally of the receptor for removal of the spring clip to disengage the locking shoulders and permit withdrawal of the projector rod.

In still another aspect, this invention features a method of operatively connecting an operating member to a parking brake latch release member when a vehicle instrument panel is installed to the vehicle support structure, which comprises the steps of a. providing fittings on each of the members which are interengageable to interconnect the members throughout a range of positions, b. mounting the operating member on a vehicle instrument panel for sliding movement relative thereto, c. mounting the latch release member on the vehicle so that its fitting will interengage the operating member fitting in one of said positions when the instrument panel is installed, d. installing the instrument panel to engage the fittings and operatively connect the members, and e. sliding the operating member toward the instrument panel to interengage the fittings in one of said positions to operatively connect the members.

In a further aspect, this invention features such a method which includes the additional steps of f. providing an elongated projector rod as the operating member fitting, g. providing a receptor on the release member including locking means for engaging the projector rod upon insertion to prevent withdrawal, and h. providing a funnel on the receptor for directing the projector into the receptor to accommodate misalignment of the members during installation.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
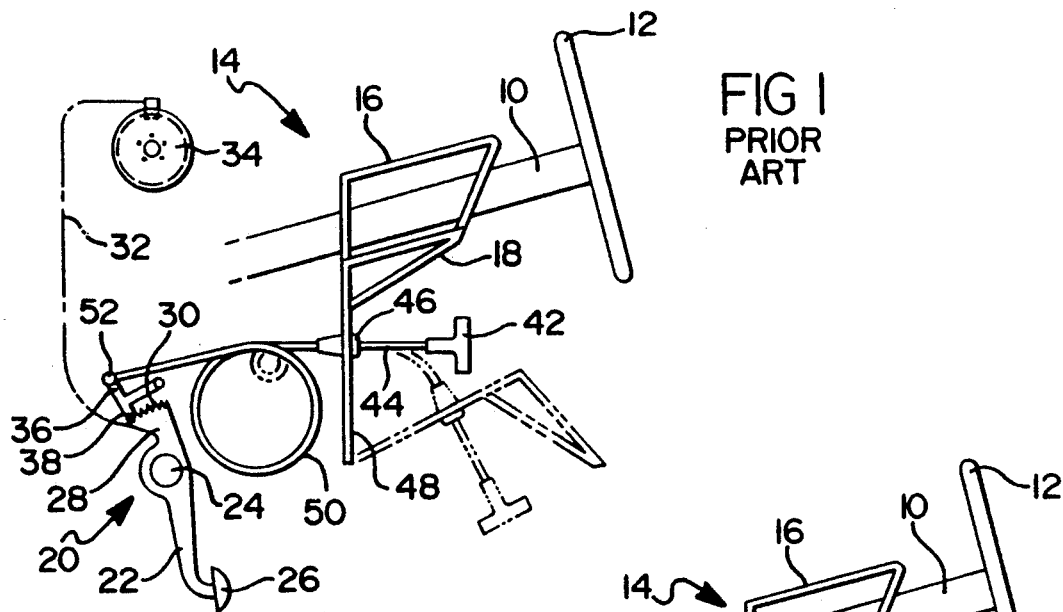
FIG. 1 is a schematic representation of a vehicle instrument panel and parking brake actuator incorporating a prior art parking brake operating handle attachment.

FIG. 1 of the drawings illustrates a conventional prior art parking brake operating handle attachment. A vehicle steering column 10 mounts a steering wheel 12 outwardly of an instrument panel 14, which comprises an upper portion 16 and a lower portion 18, shown assembled in solid lines.

A parking brake actuator 20 comprises a pedal lever 22 that is pivoted at 24 to structure (not shown) and mounts an operating pedal 26 at its lower end. At its other end, lever 22 mounts a sector 28 having a plurality of teeth 30. Lever 22 is conventionally operatively connected via a cable 32 to a parking brake 34. Pedal 24 may be depressed to rotate lever 22 clockwise to apply parking brake 34 in a well-known manner.

A pivotable locking pawl 36 has a nose 38 that is spring biased into engagement between teeth 30 to form a latch mechanism for releasably latching the parking brake actuator 20 in a brake applied position, as illustrated. A manually operable handle 42 is mounted on the outer end of a rod 44 that is reciprocable through a fitting 46 in vertical wall 48 of instrument panel lower portion 18. The inner end of rod 44 is connected to a Bowden cable 50, the other end of which connects at 52 to locking pawl 36.

The pre-installed position of lower instrument panel portion 18 is shown in phantom lines. Rod 44 is mounted in fitting 46 and Bowden cable 50 is attached before instrument panel lower portion 18 is mounted. Since lower instrument panel portion 18 is remote from its installed position shown in solid lines, cable 50 must be elongated. Cable 50 is normally supplied in looped form, as shown in solid lines, so that it can be stretched, as shown in phantom, to enable attachment to both rod 44 and pawl 36 before installation of lower panel portion 18.

After installation of panel portion 18, cable 50 assumes its larger loop configuration shown in solid lines. Since this loop takes up under-panel space, cable 18 is made as short as possible to keep the loop as small as possible. This causes cable 50 to be stretched upon initial attachment to pre-installed panel portion 18 so that its loop is nearly kinked. This is potentially injurious to cable 50.

Figure 2:
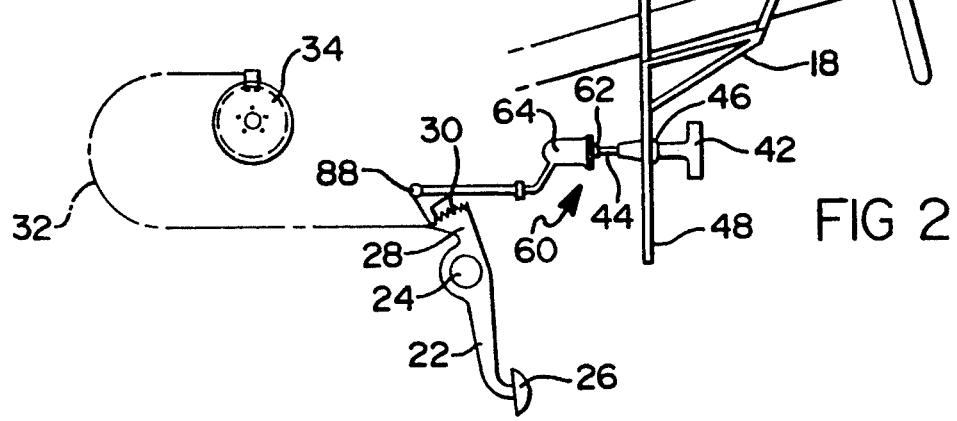
FIG. 2 is a schematic representation similar to FIG. 1, but incorporating a parking brake operating handle attachment according to this invention, with the instrument panel illustrated as installed.
Figure 3:
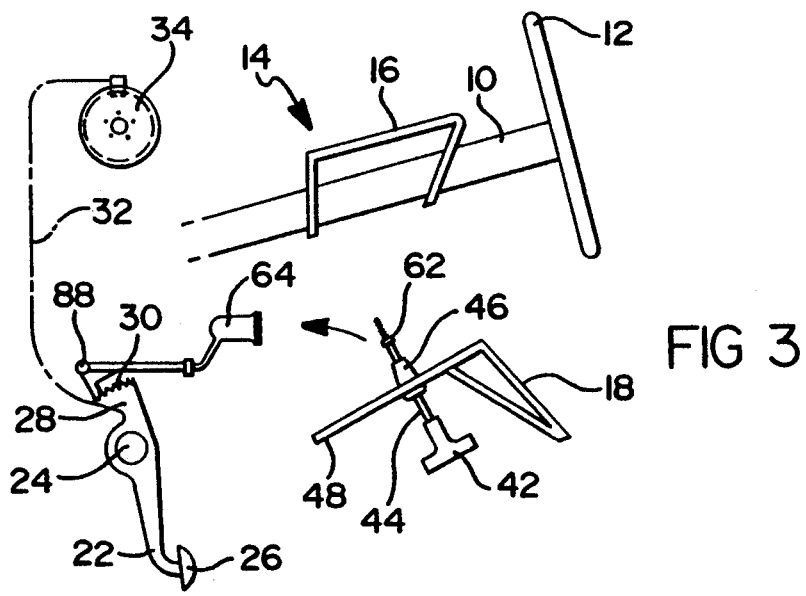
FIG. 3 is a view similar to FIG. 2, with the instrument panel illustrated prior to installation.

FIGS. 2 and 3 are similar to FIG. 1, but illustrate a parking brake handle attachment according to this invention. According to this invention, the Bowden cable is replaced by a connecting device 60. Device 60 comprises interengageable plastic fittings 62 and 64, connected to rod 44 and to pawl 36, respectively.

Figure 4:
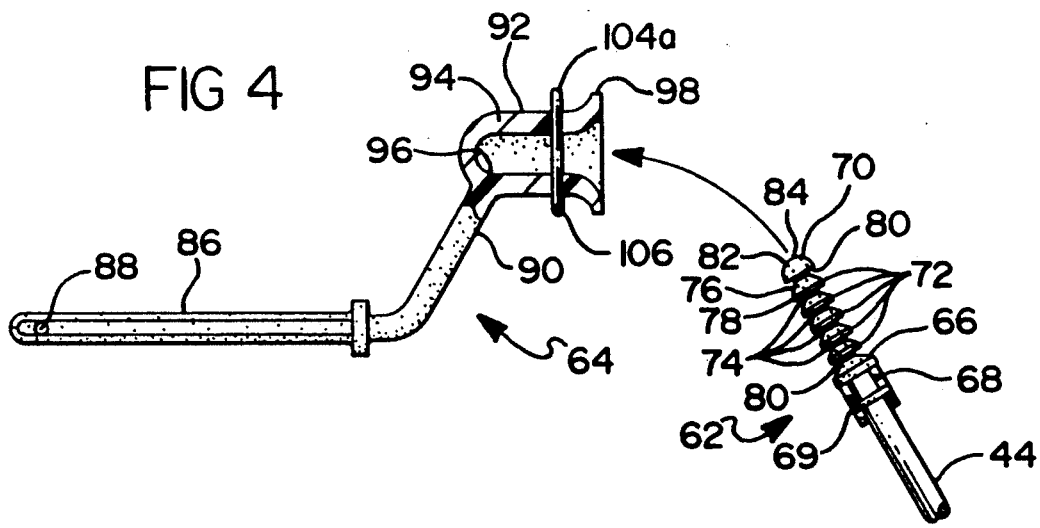
FIG. 4 is a partially broken-away side view of the interengageable fittings used in the parking brake operating handle attachment of this invention, shown prior to assembly.
Figure 5:
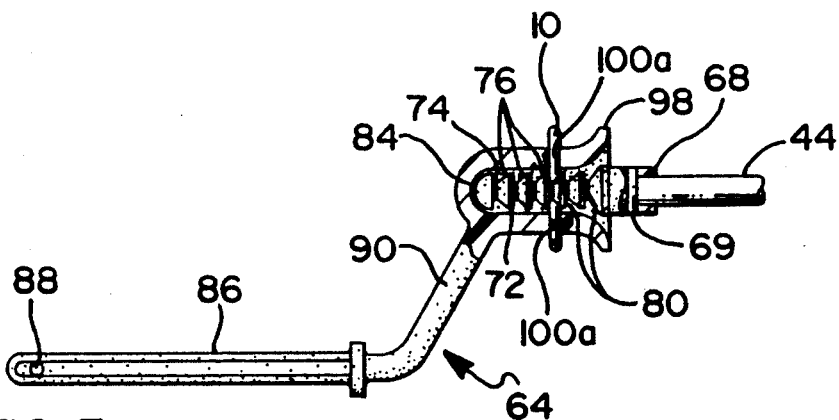
FIG. 5 is a view similar to FIG. 4, with the fittings shown assembled.
Figure 6:
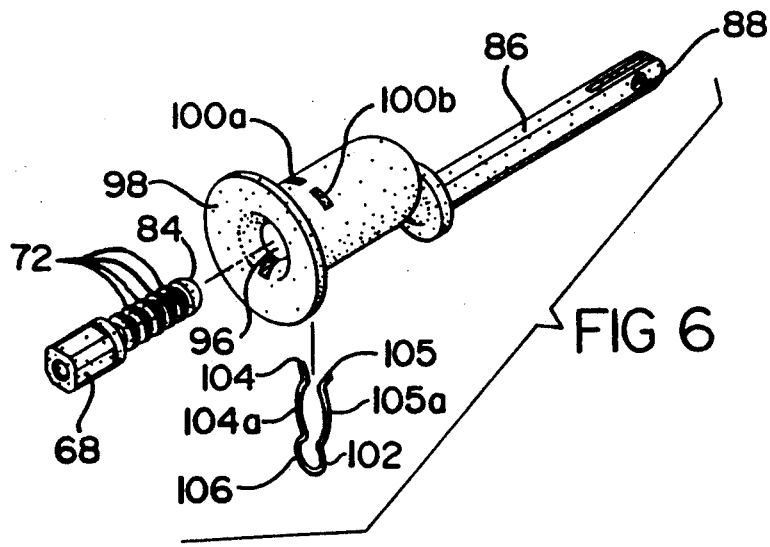
FIG. 6 is a an exploded perspective view of the fittings of FIGS. 4 and 5.

Connecting device 60 is shown in detail in FIGS. 3-5. Fitting 62 comprises a rod 66 having a socket 68 at one end for receiving the inner end of operating rod 44, which is secured by a pin 69. The other end of rod 66 is a projector 70 which comprises a plurality of ridges 72 that are spaced by inner lands 74. Ridges 72 include angled leading camming surfaces 76, which diverge outwardly from inner lands 74, and terminate in outer lands 78. Ridges 72 include locking shoulders 80 which extend radially outwardly from inner lands 74 to outer lands 78. The distal end of rod 66 mounts a primary ridge 82 that has a rounded leading camming surface or nose 84.

Fitting 64 includes a connecting rod portion 86 which is connected to pawl 36 via a slot 88. An intermediate portion 90 connects rod portion 86 to receptor portion 92. Receptor 92 comprises a generally cylindrical body 94 having a cylindrical bore or socket 96 which terminates in an entrance funnel or bell 98. Socket 96 has an inner diameter slightly larger than the outer diameter of ridges 72 of projector rod 66.

Receptor body 94 has a pair of parallel through slots 100a, 100b which flank the socket centerline. A spring retaining clip 102 has legs 104, 105 that are received through slots 100a, 100b when clip 102 is installed in receptor body 94. A loop connector 106 interconnects legs 104, 105 and remains external of receptor body 94 when spring clip 102 is installed.

In the installed position of clip 102, intermediate curved leg portions 104a, 105a are located within socket 96 astride its centerline. Leg portions 104a, 105a are spaced apart a distance less than the outer diameter of projector rod ridges 72.

The connecting device 60 is automatically assembled when instrument panel portion 18 is installed, as will now be explained. FIGS. 3 and 4 illustrate connecting device 60 in the uninstalled position of instrument panel portion 18. Operating rod 44, with handle 42 and fitting 62 attached, is pre-installed in fitting 46 in instrument panel wall 48. Fitting 64, with spring clip 102 installed, is mounted on pawl 36.

The instrument panel lower portion 18 is installed by swinging it up from the FIG. 3 position to the FIG. 2 position. This panel movement brings fittings 62 and 64 from their FIG. 4 positions toward the FIG. 5 position. Funnel 98 guides nose 84 into socket 96. When nose 84 enters socket 96 it engages closely spaced spring clip leg portions 104a, 105a which provide an obstruction to further entry. Upon movement of panel portion 18 into the FIG. 5 position, leg portions 104a, 105a push rod 44 and handle 42 outwardly of wall 48.

After instrument panel portion 18 is installed, handle 42 is manually shoved into wall 48, which forces nose 84 to spread legs 104a, 104b sufficiently to allow projector rod 70 to enter socket 96. Ridges 72 will ratchet past spring clip 102 until handle 42 engages fitting 46. At this point, spring leg portions 104a, 105a will snap toward each other behind a ridge 72. Engagement of the leg portions 104a, 105a with locking shoulders 80 locks projector 62 to receptor 64 to operatively connect operating handle 42 to locking pawl 36.

Subsequent depression of pedal lever 22 will apply the parking brake 34 in a well-known manner. To release the parking brake, handle 42 is moved outwardly of panel wall 48. Since the component parts 62 and 64 of connecting device 60 are locked together, movement of handle 42 will disengage pawl nose 38 to disengage sector teeth 30 to release parking brake 34.

Should it become necessary to remove lower instrument panel portion 18, projector 62 must be disengaged from receptor 64. This is easily accomplished by merely grasping the connecting loop 106 and pulling spring clip 102 away from receptor 64. This action releases projector 62 for removal from receptor 64, whereupon instrument panel portion 18 can be disassembled.

Any variations in the relative location of pawl 36 and instrument panel wall 48 are automatically compensated for by the provision of a plurality of the longitudinally-spaced ridges 72. This provides an automatic adjustment of handle 42 which assures that it will always be properly positioned relative to panel wall 48.

Thus this invention provides a connecting device for operatively connecting a parking brake release mechanism to an operating handle, that is pre-installed in an instrument panel which is subsequently installed to the vehicle structure, that is operable to release the parking brake without increased manual force and that is simple to assemble and to disassemble.

While only a preferred embodiment has been illustrated and described, obvious modifications thereof are contemplated within the scope of this invention and the following claims.

We claim:

1. In a vehicle having a parking brake actuator movable between positions to apply and release a parking brake, a latch mechanism for latching the actuator in brake apply position including a latch release member, and an operating member mounted on vehicle structure for operating the latch release member, a connecting device for connecting the operating member to the latch release member, comprising
    interengageable fittings on both members for operatively interconnecting the members together,
    one of the fittings comprising a projector having an elongated locking surface,
    the other of the fittings comprising a receptor for receiving the projector throughout a range of positions, and
    locking means carried by the receptor for engaging the projector upon insertion to any position in said range, while preventing withdrawal of the projector.

2. The connecting device of claim 1, including means for disengaging the locking means to permit withdrawal of the projector.

3. The connecting device of claim 1, wherein the projector is an elongated rod and the locking surface comprises a plurality of spaced ridges on the rod each having a leading camming surface and a trailing locking shoulder engageable by the locking means.

4. The connecting device of claim 3, wherein the locking means comprise a locking finger biased into contact with the rod, the camming surfaces moving the finger away from the rod to enable insertion of the rod, but engagement of the finger with a locking shoulder preventing subsequent withdrawal.

5. The connecting device of claim 4, including means for disengaging the finger from a locking shoulder to enable withdrawal of the projector.

6. The connecting device of claim 1, wherein the projector is an elongated rod, and the receptor includes an entrance funnel for guiding the projector rod into the receptor to accommodate relative misalignment of the projector and receptor.

7. The connecting device of claim 6, wherein the projector rod includes a plurality of longitudinally-spaced ridges having leading camming surfaces and trailing locking shoulders, and the receptor locking means comprise a locking finger biased into contact with the rod, the camming surfaces moving the finger away from the rod to enable insertion of the rod, but engagement of the finger with a locking shoulder preventing subsequent withdrawal.

8. The connecting device of claim 7, including means for disengaging the locking finger from a locking shoulder to permit withdrawal of the projector rod.

9. The connecting device of claim 8, wherein a spring clip comprising a pair of locking fingers are provided for engaging the locking shoulders, and the disengaging means comprise a connection portion which is engageable externally of the receptor for removal of the spring clip to disengage the fingers from the locking shoulder and permit withdrawal of the projector rod.

10. A method of operatively connecting an operating member to a parking brake latch release member when a vehicle instrument panel is installed to a vehicle support structure, comprising the steps of
    providing fittings on each of the members which are interengageable to interconnect the members throughout a range of positions,
    mounting the operating member on a vehicle instrument panel for sliding movement relative thereto,
    mounting the latch release member on the vehicle so that its fitting will interengage the operating member fitting in one of said positions when the instrument panel is installed,
    installing the instrument panel to engage the fittings and operatively connect the members, and
    sliding the operating member toward the instrument panel to interengage the fittings in one of said positions to operatively connect the members.

11. The method of claim 10, including the steps of providing an elongated projector rod as the operating member fitting, providing a receptor on the release member including locking means for engaging the projector rod upon insertion to prevent withdrawal, and providing a funnel on the receptor for directing the projector into the receptor to accommodate misalignment of the members during installation.

12. In a vehicle having a parking brake actuator movable between positions to apply and to release a parking brake, a latch mechanism for latching the actuator in brake apply position including a latch release lever, and an operating rod having a handle on one end thereof, the rod being mounted to an instrument panel of the vehicle for sliding movement to operate the latch release lever, a connecting device for connecting the operating rod to the latch release lever during installation of the instrument panel, comprising a projector fitting mounted on the other end of the operating rod and having an elongated locking surface, and a receptor mounted on the latch release lever for receiving the projector therein throughout a range of positions, and locking means on the receptor for engaging the locking surface upon insertion of the projector to any position in said range, while preventing withdrawal of the projector.

13. The connecting device of claim 12, wherein the projector rod is generally cylindrical and the locking surface comprises a series of longitudinally-spaced annular ridges having forwardly-converging leading surfaces and having trailing surfaces forming locking shoulders, and the locking means comprise a pair of spring fingers engaging the ridges upon insertion of the projector.

14. The connecting device of claim 13, wherein the receptor includes an elongated cylindrical bore having an outer entry funnel for directing the projector rod into the receptor to accommodate misalignment of the members during installation.

15. The connecting device of claim 14, wherein the receptor includes a pair of slots entering the bore for receiving the spring fingers into the bore.

16. The connecting device of claim 15, wherein the locking means is a spring clip comprising the spring fingers and a connection portion which is engageable externally of the receptor for removal of the spring clip to disengage the fingers from the locking shoulders and permit withdrawal of the projector rod.

17. The connecting device of claim 16, wherein the receptor comprises a unitary piece of plastic having a generally cylindrical outer surface, with the funnel comprising a bell-shaped entry portion extending radially beyond the outer surface.

18. The connecting device of claim 17, wherein the slots extend completely through the body perpendicular to and astride the bore axis, enabling the spring fingers to extend into the bore, while maintaining the connecting portion externally of the outer surface.

* * * * *